United States Patent
Su

(10) Patent No.: US 6,972,975 B2
(45) Date of Patent: Dec. 6, 2005

(54) VOLTAGE CONVERTER WITH SELECTABLE OUTPUT VOLTAGE LEVELS

(76) Inventor: Carl Su, 3F-3, No.192, Rueiguang Rd., Neihu Chiu, Taipei (TW) 114

( * ) Notice: Subject to any disclaimer, the term of this patent is extended or adjusted under 35 U.S.C. 154(b) by 0 days.

(21) Appl. No.: 10/865,574

(22) Filed: Jun. 10, 2004

(65) Prior Publication Data

US 2004/0259436 A1    Dec. 23, 2004

Related U.S. Application Data

(63) Continuation-in-part of application No. 10/600,462, filed on Jun. 23, 2003, now abandoned.

(51) Int. Cl.[7] ............................................. H02M 1/00
(52) U.S. Cl. .................. 363/146; 363/144; 323/349
(58) Field of Search .............................. 363/144, 146; 323/318, 349

(56) References Cited

U.S. PATENT DOCUMENTS 5,347,211 A    9/1994 Jakubowski ............... 232/351
6,266,261 B1 *    7/2001 Lanni ...................... 363/144
6,628,535 B1    9/2003 Wu ........................... 363/146

* cited by examiner

Primary Examiner—Gary L Laxton
(74) Attorney, Agent, or Firm—Ohlandt, Greeley, Ruggiero & Perle, L.L.P.

(57) ABSTRACT

A voltage converter includes a converter circuit, a casing, and a jumper member. The converter circuit includes a voltage level setting circuit configured for generating a feedback signal, wherein an output voltage generated by the converter circuit has a voltage level that is determined according to value of the feedback signal. The voltage level setting circuit includes a plurality of first electrical components and a first common line. The casing receives the converter circuit, and is formed with a set of first jumper holes corresponding to the first electrical components, and a second jumper hole corresponding to the first common line. The jumper member connects selected ones of the first electrical components to the first common line upon insertion into the first and second jumper holes. The value of the feedback signal is dependent upon connection status of the first electrical components to the first common line.

12 Claims, 5 Drawing Sheets

VOLTAGE CONVERTER WITH SELECTABLE OUTPUT VOLTAGE LEVELS

CROSS-REFERENCE TO RELATED APPLICATION

This application is a continuation-in-part (CIP) of U.S. patent application Ser. No. 10/600,462, filed on Jun. 23, 2003 now abandoned.

BACKGROUND OF THE INVENTION

1. Field of the Invention

The invention relates to a voltage converter, more particularly to a voltage converter with selectable output voltage levels.

2. Description of the Related Art

Converters for converting supply voltages of AC or DC power sources into an output voltage having a desired voltage level are known in the art. Unfortunately, the fact that there are many electronic devices having different operating voltage requirements makes it difficult for manufacturers to provide power converters capable of servicing them all.

In U.S. Pat. No. 5,347,211, there is disclosed a power converter for providing a selectable desired voltage. The power converter has a converter circuit having an input port for receiving an input of a first voltage, and an output port for providing an output of a second voltage. The converter circuit also has a keyway for receiving a key. The key, which is configured to be received by the keyway, contains an electrical component and has a body within which the electrical component is disposed. The output voltage of the converter is determined by the value of the component disposed within the body of the key such that the output voltage can be varied by replacing the key with another key having an electrical component of a different value.

In U.S. Pat. No. 6,628,535, there is disclosed an electric adapter system including an adapter, which has a circuit connected between input and output connection devices that are respectively connectable with an external power source and a power consuming device. The circuit includes a voltage level control device and a feedback device. The voltage level control device supplies an output voltage to the output connection device via positive and negative power terminals. The feedback device includes a plurality of voltage selection lines each having a different electric resistance whereby by selectively connecting one of the voltage selection lines to the negative power terminal, a feedback signal is generated by the feedback device and is applied to the voltage level control device for changing the voltage level of the output voltage supplied by the voltage level control device.

The power converter of U.S. Pat. No. 5,347,211 requires a key that contains an electrical component for voltage selection. Thus, different keys that contain electrical components having different component values must be prepared to permit voltage selection. The electric adapter system of U.S. Pat. No. 6,628,535 requires a connector between the output connection device and the adapter circuit to selectively connect the voltage selection lines to the negative power terminal. Because current is supplied to the power consuming device via the connector, the pin count of the connector is required to be relatively large (i.e., at least six) in order to enable generation of different feedback signals. Moreover, the connector pins should not be too thick to prevent overheating when current flows therethrough, and should be adequately spaced apart to avoid cross talk and short-circuiting. Furthermore, it is noted that both the key of U.S. Pat. No. 5,347,211 and the connector of U.S. Pat. No. 6,628,535 are relatively difficult to fabricate.

SUMMARY OF THE INVENTION

Therefore, the object of the present invention is to provide a voltage converter having an output voltage level that can be selected through a jumper member with a relatively simple construction.

According to this invention, a voltage converter comprises a converter circuit, a casing, and a jumper member.

The converter circuit has an input port for receiving an input voltage and an output port for providing an output voltage, and includes a voltage level setting circuit that is configured for generating a feedback signal. The output voltage generated by the converter circuit has a voltage level that is determined according to the value of the feedback signal. The voltage level setting circuit includes a plurality of first electrical components and a first common line.

The casing receives the converter circuit, and is formed with a set of first jumper holes, each of which corresponds to a respective one of the first electrical components, and at least a second jumper hole corresponding to the first common line.

The jumper member is inserted into at least one of the first jumper holes, and is further inserted into the second jumper hole for connecting electrically selected at least one of the first electrical components to the first common line. The value of the feedback signal is dependent upon connection status of the first electrical components to the first common line.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
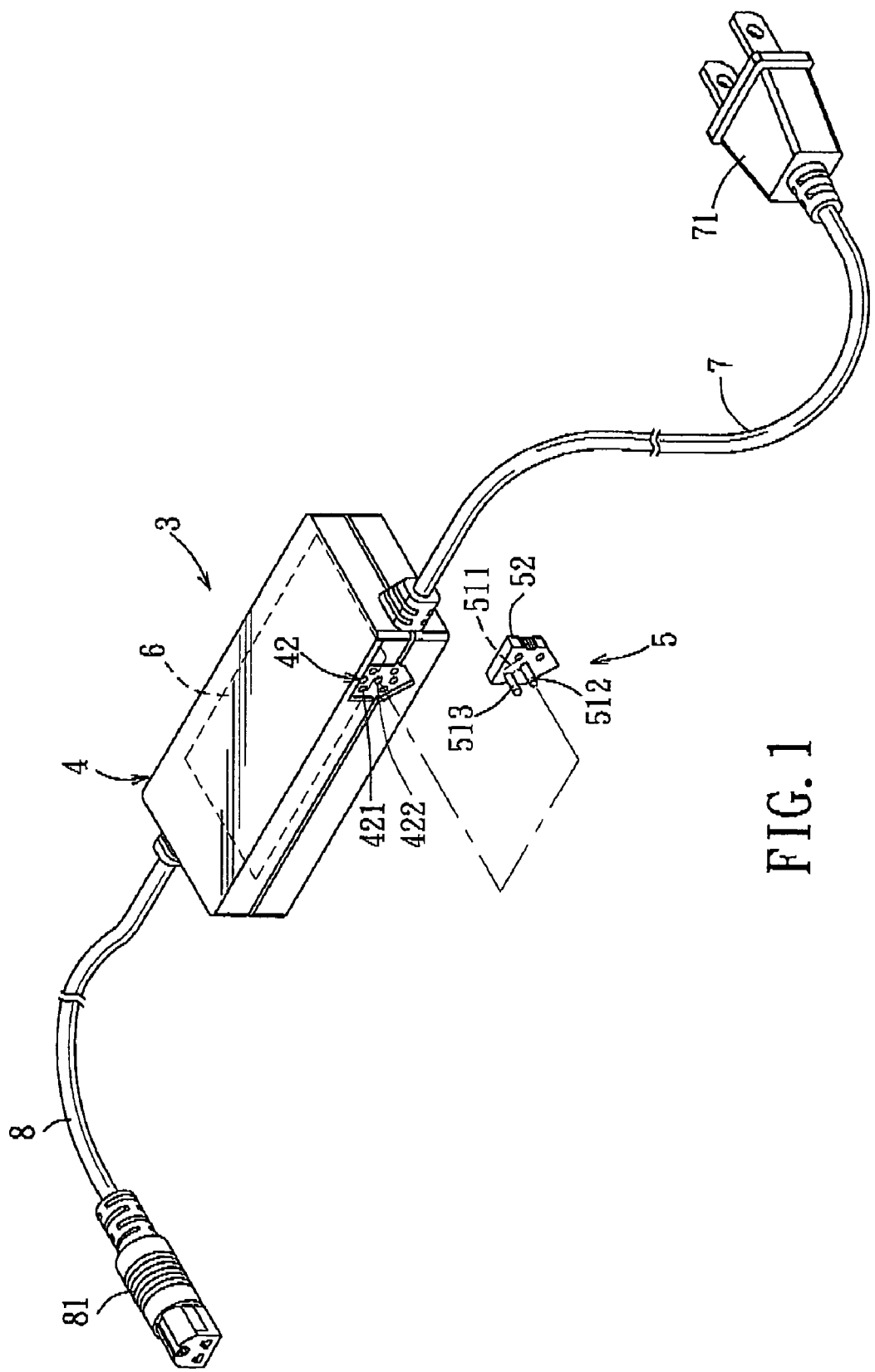
FIG. 1 is a perspective view of a preferred embodiment of a voltage converter with selectable output voltage levels according to the present invention.
Figure 2:
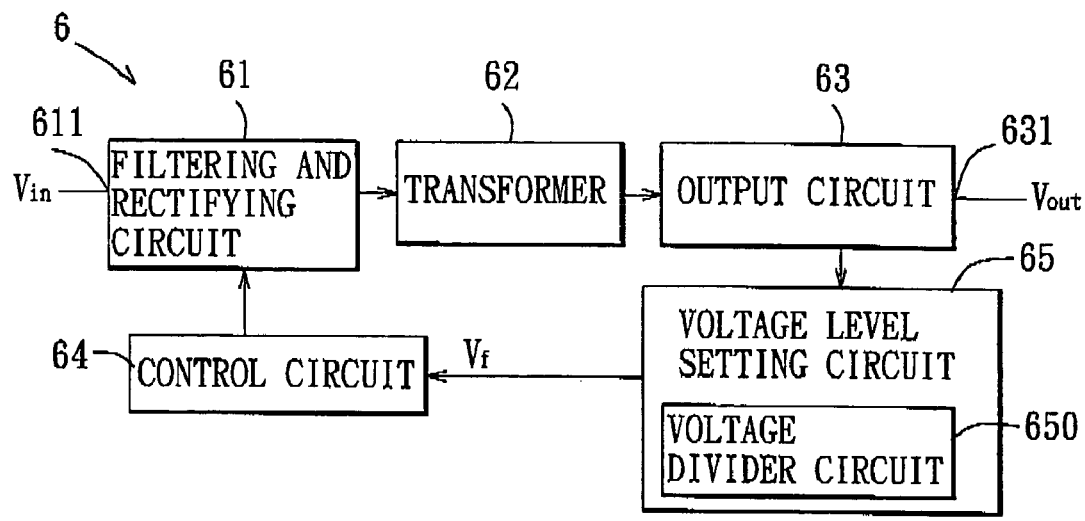
FIG. 2 is a schematic circuit block diagram of the preferred embodiment.
Figure 4:
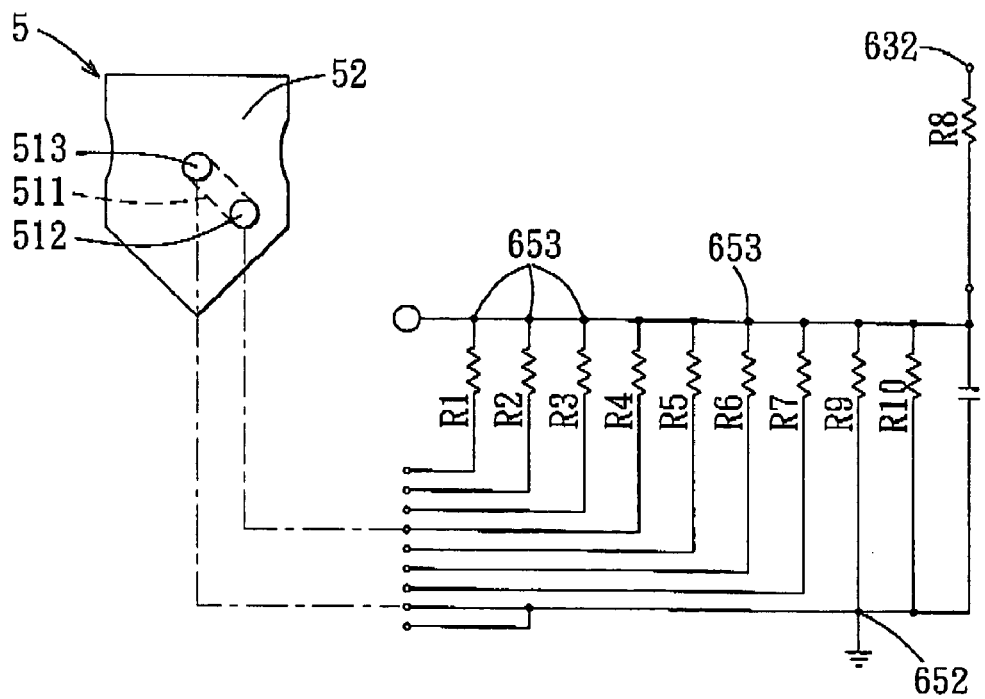
FIG. 4 is a schematic electrical circuit diagram to illustrate a voltage divider circuit employed in a voltage level setting circuit of the converter circuit of FIG. 3.
Figure 3:
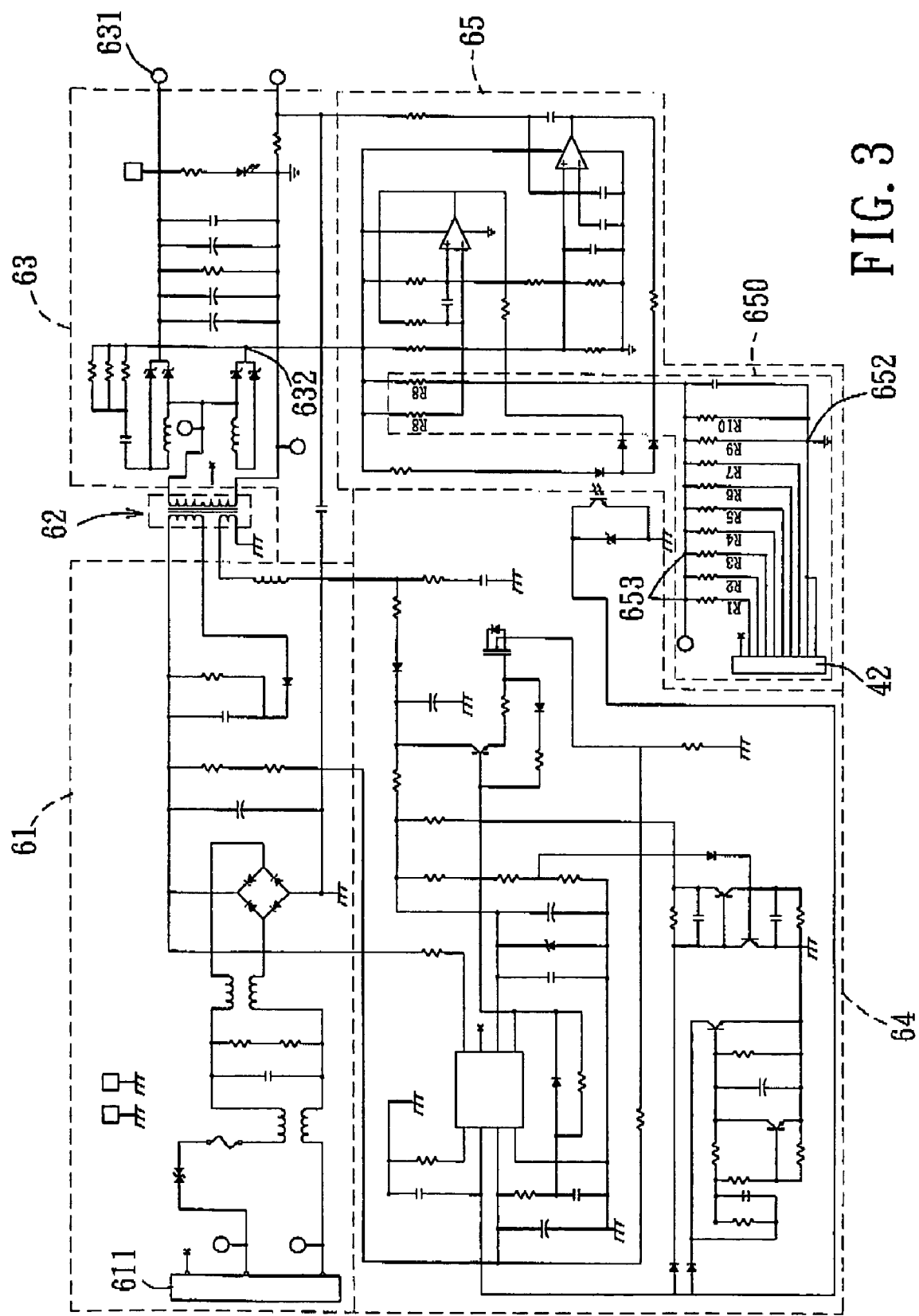
FIG. 3 is a schematic electrical circuit diagram of a converter circuit of the preferred embodiment.

Referring to FIGS. 1 to 4, the preferred embodiment of a voltage converter 3 with selectable output voltage levels according to the present invention is shown to include a converter circuit 6, a casing 4, a jumper member 5, a first end connection device 7, and a second end connection device 8.

The converter circuit 6 has an input port 611 for receiving an input voltage ($V_{in}$) and an output port 631 for providing an output voltage ($V_{out}$), and includes a voltage level setting circuit 65 that is configured for generating a feedback signal ($V_f$). The output voltage ($V_{out}$) generated by the converter circuit 6 has a voltage level that is determined according to the value of the feedback signal ($V_f$). The converter circuit 6 further includes a filtering and rectifying circuit 61, a transformer 62, an output circuit 63, and a control circuit 64. The filtering and rectifying circuit 61 is provided with the input port 611. The transformer 62 has a primary side coupled to the filtering and rectifying circuit 61, and a secondary side. The output circuit 63 is coupled to the secondary side of the transformer 62, and is provided with the output port 631. The voltage level setting circuit 65 is coupled to the output circuit 63. The control circuit 64 is coupled to the voltage level setting circuit 65 and the filtering and rectifying circuit 61, and controls operation of the filtering and rectifying circuit 61 in accordance with the feedback signal ($V_f$) from the voltage level setting circuit 65 such that the voltage level of the output voltage ($V_{out}$) at the output port 631 corresponds to the value of the feedback signal ($V_f$). The voltage level setting circuit 65 includes a plurality of first electrical components (R1–R7), and a first common line 652. In this embodiment, the first electrical components (R1–R7) are resistors, and the first common line 652 is a ground line. The voltage level setting circuit 65 further includes a second common line 653 coupled electrically to the first electrical components (R1–R7), and a second electrical component (R8) (also a resistor in this embodiment) coupled electrically to the second common line 653 and a node 632 of the output circuit 63. The second electrical component (R8) cooperates with the first electrical components (R1–R7) to form a voltage divider circuit 650. The voltage level setting circuit 65 further includes at least a third electrical component (R9, R10) (also a resistor in this embodiment) coupled electrically across the first and second common lines 652, 653.

The casing 4 receives the converter circuit 6, and is provided with a socket unit 42 that is formed with a set of first jumper holes 421, each of which corresponds to a respective one of the first electrical components (R1–R7), and a second jumper hole 422 corresponding to the first common line 652.

The jumper member 5 includes a base plate 52, at least one first conductive pin 513 extending from the base plate 52 and inserted into one of the first jumper holes 421 to connect electrically with the corresponding one of the first electrical components (R1–R7), and a second conductive pin 512 extending from the base plate 52, coupled electrically to the first conductive pin 513 via an embedded conductor 511 in the base plate 52, and inserted into the second jumper hole 422 to connect electrically with the first common line 652. The value of the feedback signal ($V_f$) is dependent upon connection status of the first electrical components (R1–R7) to the first common line 652.

The first end connection device 7 is connected to the input port 611 of the converter circuit 6, extends outwardly of the casing 4, and is adapted to be connected to an external power source such that the input port 611 of the converter circuit 6 receives the input voltage ($V_{in}$) via the first end connection device 7. In this embodiment, the input voltage ($V_{in}$) is an alternating current voltage, and the first end connection device 7 is terminated by a plug 71 for a commercial AC electrical power outlet.

The second end connection device 8 is connected to the output port 631 of the converter circuit 6, extends outwardly of the casing 4, and is adapted to be connected to an external power consuming device, whereby the external power consuming device receives the output voltage ($V_{out}$) from the output port 631 of the converter circuit 6 via the second end connection device 8. In this embodiment, the output voltage ($V_{out}$) is a direct current voltage, and the second end connection device 8 is terminated by a power connector 81 for the external power consuming device.

In use, the filtering and rectifying circuit 61 filters and rectifies the input voltage ($V_{in}$) from the first end connection device 7, and is controlled by the control circuit 64 to provide a direct current voltage output to the transformer 62. The transformer 62 steps down the voltage output of the filtering and rectifying circuit 61, and outputs the same to the output circuit 63. Since the voltage level at the second common line 653 of the voltage level setting circuit 65 varies depending on the connection status of the first electrical components (R1–R7) to the first common line 652, the voltage level setting circuit 65 is able to generate the feedback signal ($V_f$) that is indicative of said connection status and that is provided to the control circuit 64. In particular, the voltage level setting circuit 65 generates the feedback signal ($V_f$) by comparing the voltage level at the second common line 653 with a reference voltage. In response to the feedback signal ($V_f$), the control circuit 64 controls operation of the filtering and rectifying circuit 61 such that the output voltage ($V_{out}$) corresponds to the value of the feedback signal ($V_f$). Since the feature of the present invention does not reside in how the control circuit 64 controls operation of the filtering and rectifying circuit 61 to adjust the voltage level of the output voltage ($V_{out}$), which can be readily appreciated by those skilled in the art, a detailed description of the same will be dispensed with herein for the sake of brevity.

When no jumper member 5 is in use, none of the first electrical components (R1–R7) is connected to the first common line 652, and the feedback signal ($V_f$) has a default value that is determined based on the second and third electrical components (R8, R9, R10).

Figure 5:
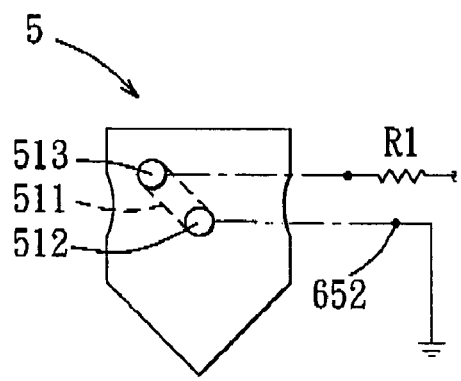
FIG. 5 illustrates how an exemplary jumper member connects a first electrical component of the voltage level setting circuit to a first common line.
Figure 6:
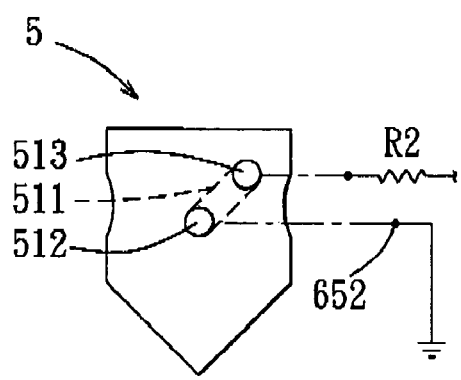
FIG. 6 illustrates how another exemplary jumper member connects another first electrical component of the voltage level setting circuit to the first common line.
Figure 7:
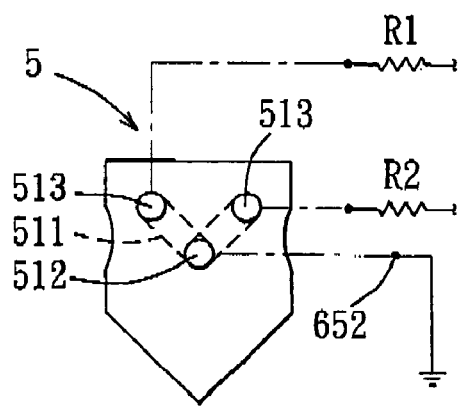
FIG. 7 illustrates how yet another exemplary jumper member connects a pair of the first electrical components of the voltage level setting circuit to the first common line.

FIGS. 5, 6 and 7 illustrate exemplary jumper members 5 suitable for use in the preferred embodiment. In FIG. 5, the jumper member 5 is used to connect the first electrical component (R1) to the first common line 652. In FIG. 6, the jumper member 5 is used to connect the first electrical component (R2) to the first common line 652. In FIG. 7, the jumper member 5 is used to connect two first electrical components (R1–R2) to the first common line 652. Depending on the connection states of the first electrical components (R1–R7) to the first common line 652, the resistance between the first and second common lines 652, 653 is varied, thereby resulting in different feedback signals for output voltage level selection.

It should be noted herein that the actual number of the first electrical components employed in the voltage level setting circuit 65 can be varied to meet actual requirements.

Figure 8:
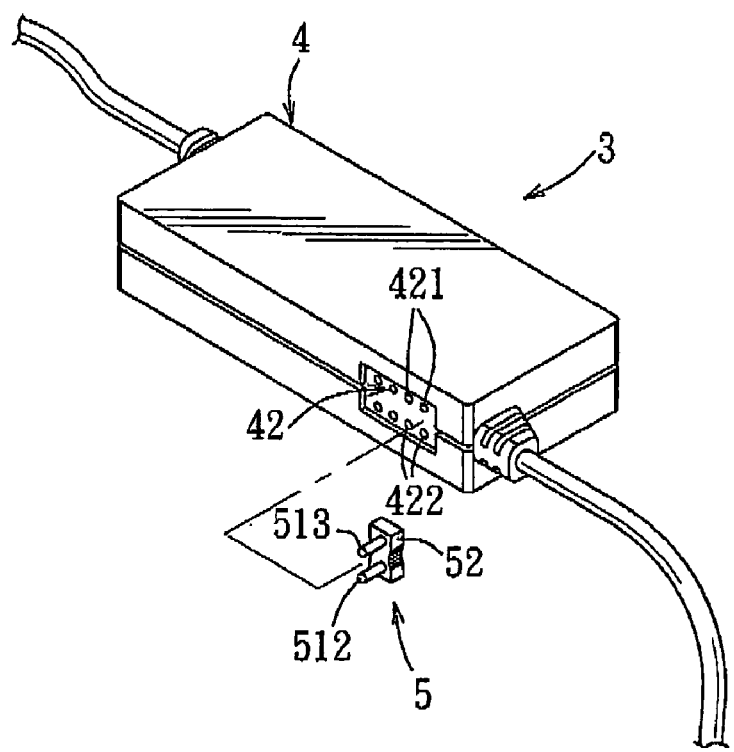
FIG. 8 is a perspective view of a modified preferred embodiment of a voltage converter with selectable output voltage levels according to the present invention.
Figure 9:
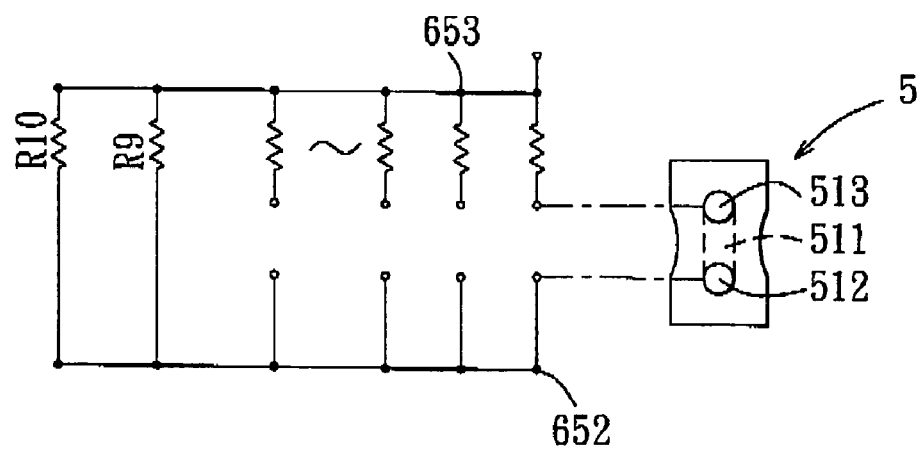
FIG. 9 illustrates how a jumper member connects a first electrical component of a voltage level setting circuit to a first common line in the modified preferred embodiment.

FIGS. 8 and 9 illustrate a modified embodiment of the voltage converter 3 with selectable output voltage levels according to the present invention. Unlike the previous embodiment, the socket unit 42 of the casing 4 of the voltage converter of this embodiment is formed with an upper row of first jumper holes 421, each of which corresponds to a respective one of the first electrical components of the voltage level setting circuit, and a lower row of second jumper holes 422, each of which corresponds to the first common line 652 and is aligned with a respective one of the first jumper holes 421. Unlike the power converter of U.S. Pat. No. 5,347,211, which requires different keys that contain electrical components having different component values for voltage selection, the voltage converter 3 of this embodiment permits output voltage level selection using only one jumper member 5.

It has thus been shown that output voltage level selection in the voltage converter 3 according to this invention is accomplished using a jumper member 5, which has a simple construction that can facilitate fabrication of the same.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A voltage converter comprising:
   a converter circuit having an input port for receiving an input voltage and an output port for providing an output voltage, said converter circuit including a voltage level setting circuit that is configured for generating a feedback signal, the output voltage generated by said converter circuit having a voltage level that is determined according to value of the feedback signal, said voltage level setting circuit including a plurality of first electrical components and a first common line;
   a casing that receives said converter circuit and that is formed with a set of first jumper holes, each of which corresponds to a respective one of said first electrical components, and at least a second jumper hole corresponding to said first common line; and
   a jumper member inserted into at least one of said first jumper holes and further inserted into said second jumper hole for connecting electrically selected at least one of said first electrical components to said first common line, the value of the feedback signal being dependent upon connection status of said first electrical components to said first common line.

2. The voltage converter as claimed in claim 1, further comprising an end connection device connected to said input port of said converter circuit, extending outwardly of said casing, and adapted to be connected to an external power source, said input port of said converter circuit receiving the input voltage via said end connection device.

3. The voltage converter as claimed in claim 2, wherein the input voltage is an alternating current voltage.

4. The voltage converter as claimed in claim 1, further comprising an end connection device connected to said output port of said converter circuit, extending outwardly of said casing, and adapted to be connected to an external power consuming device, whereby the external power consuming device receives the output voltage from said output port of said converter circuit via said end connection device.

5. The voltage converter as claimed in claim 4, wherein the output voltage is a direct current voltage.

6. The voltage converter as claimed in claim 1, wherein each of said first electrical components is a resistor.

7. The voltage converter as claimed in claim 1, wherein said jumper member includes a base plate, at least one first conductive pin extending from said base plate and inserted into one of said first jumper holes to connect electrically with the corresponding one of said first electrical components, and a second conductive pin extending from said base plate, coupled electrically to said at least one first conductive pin, and inserted into said second jumper hole to connect electrically with said first common line.

8. The voltage converter as claimed in claim 1, wherein said voltage level setting circuit further includes a second common line coupled electrically to said first electrical components, and a second electrical component coupled electrically to said second common line and cooperating with said first electrical components to form a voltage divider circuit.

9. The voltage converter as claimed in claim 8, wherein each of said first and second electrical components is a resistor.

10. The voltage converter as claimed in claim 8, wherein said voltage level setting circuit further includes at least a third electrical component coupled electrically across said first and second common lines.

11. The voltage converter as claimed in claim 10, wherein each of said first, second and third electrical components is a resistor.

12. The voltage converter as claimed in claim 1, wherein said converter circuit further includes:
   a filtering and rectifying circuit provided with said input port;
   a transformer having a primary side coupled to said filtering and rectifying circuit, and a secondary side;
   an output circuit coupled to said secondary side of said transformer and provided with said output port, said voltage level setting circuit being coupled to said output circuit; and
   a control circuit coupled to said voltage level setting circuit and said filtering and rectifying circuit, said control circuit controlling operation of said filtering and rectifying circuit in accordance with the feedback signal from said voltage level setting circuit such that the voltage level of the output voltage at said output port corresponds to the value of the feedback signal.

* * * * *